US007941310B2

(12) United States Patent
Park

(10) Patent No.: US 7,941,310 B2
(45) Date of Patent: May 10, 2011

(54) SYSTEM AND METHOD FOR DETERMINING AFFIXES OF WORDS

(75) Inventor: Youngja Park, Ossining, NY (US)

(73) Assignee: International Business Machines Corporation, Armonk, NY (US)

(*) Notice: Subject to any disclaimer, the term of this patent is extended or adjusted under 35 U.S.C. 154(b) by 1565 days.

(21) Appl. No.: 10/658,968

(22) Filed: Sep. 9, 2003

(65) Prior Publication Data

US 2005/0055200 A1    Mar. 10, 2005

(51) Int. Cl.
    *G06F 17/28*    (2006.01)
(52) U.S. Cl. .................. 704/7; 704/8; 704/9; 704/10
(58) Field of Classification Search ............... 704/9, 10
    See application file for complete search history.

(56) References Cited

U.S. PATENT DOCUMENTS

| | | | | |
|---|---|---|---|---|
| 6,098,034 | A * | 8/2000 | Razin et al. | 704/9 |
| 6,405,161 | B1 * | 6/2002 | Goldsmith | 704/9 |
| 6,430,557 | B1 * | 8/2002 | Gaussier et al. | 707/5 |
| 6,714,906 | B1 * | 3/2004 | Ji et al. | 704/10 |
| 6,754,617 | B1 * | 6/2004 | Ejerhed | 704/9 |
| 6,904,402 | B1 * | 6/2005 | Wang et al. | 704/10 |
| 6,928,404 | B1 * | 8/2005 | Gopalakrishnan et al. | 704/10 |
| 7,103,536 | B1 * | 9/2006 | Kanno | 704/10 |
| 7,167,825 | B1 * | 1/2007 | Potter | 704/9 |
| 7,299,317 | B1 * | 11/2007 | Panigrahy et al. | 711/108 |
| 2003/0105638 | A1 * | 6/2003 | Taira | 704/275 |
| 2005/0256698 | A1 * | 11/2005 | Becks | 704/2 |

OTHER PUBLICATIONS

Michael R. Brent, et al., "Discovering Morphemic Suffixes: A Case Study in MDL Induction", In *Fifth International Workshop on AI and Statistics*, pp. 1-12, Ft. Lauderdale, Florida, 1995.

Dimitar Kazakov, "Unsupervised Learning of Naïve Morphology with Genetic Algorithms", *Workshop Notes of the ECML/MLnet Workshop on Empirical Learning of Natural Language Processing Tasks*, pp. 105-112, Prague, Czech Republic, Apr. 1997.

Patrick Schone, et al., "Knowledge-Free Induction of Inflectional Morphologies", *Proceedings of the North American Chapter of the Association of Computational Linguistics (NAACL-2001)*, Pittsburgh, PA, Jun. 2001.

Matthew G. Snover, et al., "Unsupervised Learning of Morphology Using a Novel Directed Search Algorithm: Taking the First Step", *Proceedings of the Sixth Meeting of the ACL Special Interest Group in Computational Phonology*, Philadelphia, Jul. 2002.

John Goldsmith, "Unsupervised Learning of the Morphology of a Natural Language", *Com-putational Linguistics*, 27:2, pp. 153-193, 2001.

* cited by examiner

*Primary Examiner* — Leonard Saint Cyr
(74) *Attorney, Agent, or Firm* — Scully, Scott, Murphy & Presser, P.C.; Louis J. Percello, Esq.

(57) ABSTRACT

A computer system and a method for analyzing text in one or more electronic documents are disclosed. The computer system comprises one or more system interfaces; and an affix process that determines one or more affixes of one or more words in one or more of the documents and provides the affixes to the system interface. The preferred embodiment of the invention may be used to build a domain specific morphology lexicon for NLP applications so that they can recognize out-of-vocabulary words. The disclosed procedure utilizes the fact that the processes of discovering prefixes and suffixes are not independent. Many words, especially in technical documents, have complex morphological structures, and thus the knowledge about prefixes helps the discovery of suffixes and vice versa.

23 Claims, 4 Drawing Sheets

FIG. 5

- Prefixes from MEDLINE

| | | | | | | | | | |
|---|---|---|---|---|---|---|---|---|---|
| non | re | pre | anti | un | de | sub | intra | self | dis |
| inter | con | neuro | hyper | multi | micro | trans | cardio | im | hypo |
| bio | vaso | radio | para | mono | electro | psycho | counter | broncho | immuno |
| semi | peri | beta2 | auto | poly | dys | endo | pharmaco | ultra | sup |
| mg | on | sympatho | angio | pseudo | gh | hemo | myo | alpha1 | alpha2 |
| nitro | veno | mis | supra | equi | normo | beta1 | chemo | histo | photo thrombo |
| arterio | uro | glyco | hydroxy | rein | clinico | 5-ht | tachy | super | chrono fore |
| adreno | | | | | | | | | |

- suffixes from MEDLINE

| | | | | | | | | | |
|---|---|---|---|---|---|---|---|---|---|
| s | ed | ing | es | ly | al | ic | ion | ally | ies |
| ity | er | ive | ation | ions | ment | ness | ized | ical | ically |
| ization | rs | ers | ations | ors | ial | ant | ied | ance | ings |
| ised | ory | ous | ase | ments | ular | ities | en | ively | est |
| ional | ary | ative | ily | izing | ication | ivity | emia | ably | isation |
| ism | ute | ists | ified | ist | graphy | ence | emic | ize | ics |
| ful | ogic | ogenic | itis | ates | ute | iness | aemia | ian | logy |

SYSTEM AND METHOD FOR DETERMINING AFFIXES OF WORDS

BACKGROUND OF THE INVENTION

1. Field of the Invention

This invention, generally, relates to the field of computer lexical acquisition and text analysis, and more specifically, the invention relates to finding affixes (prefixes, infixes, and suffixes) in words. Even more specifically, the preferred embodiment of the present invention provides a tool for automatically collecting affixes of a language from one or more documents, and for saving those affixes in a database for future use.

2. Background Art

Knowledge of affixes is important for analyzing existing words and also for producing new words. This knowledge helps to improve search results and to identify newly created words in text.

Affixes make it possible to group words into a canonical form. If we have well-complied prefixes and suffixes, and if we are given the word "play," then we know "played," "playing," "plays," "replay," "replayed," and so on are variants of "play." Affixes also add meanings to existing words. For example "or" is a suffix and when it is attached to a verb, it means "a person who performs the action described by the verb." Thus, we can interpret "actor" as "act" and "or," and understand that "actor" means a person who acts. "Antiasthmatic" is composed of "anti" and "asthmatic" and means something works against "asthma."

Many never-seen words are found in text due to the advances of new technologies and the creativity of human beings. A common way of generating new words is creating morphological variations of existing words, such as auto-inject-or and co-sponsor-ship. These newly created words that are unknown to the lexicon cause many problems for Natural Language Processing (NLP) systems.

However, if we can segment a new word into the stem and the affix(es), we can obtain linguistic information about the word such as the possible parts-of-speech and the meaning. Most present systems for morphological analysis and out-of-vocabulary handling require a precompiled list of affixes and morphological rules specifying how each affix can apply. It is very difficult and time-intensive to acquire a complete list of affixes of a language by hand.

Recently, efforts have been developing for automatically identifying morphemes. For instance, such efforts are disclosed in "Discovering Morphemic Suffixes A case Study In MDL Induction," by Brent, et al, In Proceedings of the Fifth International Workshop on Artificial Intelligence and Statistics, Ft. Lauderdale, Fla. (1995) (Brent, et al.); "Unsupervised Learning of Naïve Morphology with Genetic Algorithms," by Dimitar Kazakov, Pages 105 to 112, Workshop Notes of the ECML/Mlnet Workshop on Empirical Learning of Natural Language Processing Tasks, Prague, Czech Republic (April 1997) (Kazakov); "Knowledge-free Induction of Inflectional Morphologies," by Schone, et al. Proceedings of the North American chapter of the Association for Computational Linguistics (NAACL) (2001) (Schone, et al.); "Unsupervised Learning of Morphology Using a Novel Directed Search Algorthm: Taking the First Step," by Snover, et al, Association for computational Linguistics (ACL-2002): Workshop on Morphological and Phonological Learning (Snover, et al.); "Unsupervised Learning of the Morphology of a Natural Language," by John Goldsmith, Computational Linguistics, Volume 27, Number 2 (2001) (Goldsmith); and "Using Distributional Information to Discover Morphemes: An Automated Distribution-Driven Prefix Learner," by Marco Baroni, presented at the Morphology Meeting, Vienna, Austria, February 2002 (Baroni).

More specifically, Brent, et al. describes a system aiming at finding the right set of suffixes based on Minimum Description Length (MDL). This system, though, requires a part-of-speech tagged corpus. Kazakov also describes a MDL-based suffix finding algorithm from a raw text. This algorithm uses a simple genetic algorithm with MDL as the fitness function. Goldsmith describes another MDL-based system that attempts to provide both a list of morphemes and an analysis of each word in a corpus. He considers every possible split of each word in a corpus, and uses MDL as well as triage procedures to eliminate inappropriate parses. Schone and Jurafsky employe many sophisticated post-hoc adjustments to obtain the right conflation sets for words. Snover, et al. describes a system for the unsupervised learning of morphological suffixes and stems from a list of the most common words in a language. It tries to detect the final stem and suffix break of each word.

The first stage for discovering prefixes or suffixes would be finding a good division of a word into prefix, stem and suffix. Previous approaches parse words into two pieces: prefix and stem, or stem and suffix, depending on their goals. The most common way to parse a word in these systems is referred to as "split-all"; that is, to consider all possible splits. In this case, there are w-1 possible splits for a word of w characters.

This method is simple but computationally expensive. For instance, Kazakov reports that the computation complexity of the algorithm limits the size of the input lists to hundreds of words, and the algorithm took eight and a half hours to find suffixes from 120 words on a Pentium 90 Mhz platform.

Previous approaches limit the length of an affix to reduce the size of the search space. Those systems, otherwise, become impractical due to too many possible parses of words and complicated computations of statistical information. For instance, Goldsmith limits the length of a suffix to five letters arguing that no grammatical morphemes require more than five letters in familiar languages. However, longer prefixes and suffixes are easily found in many documents. Some examples from biomedical documents are such prefixes as pharmaco, plethysmo and ventriculo and such suffixes as ectomy, ability and ogenesis.

Baroni aims at finding a set of prefixes from a corpus based on distributional cues, which include distribution, frequency and length of words and their substrings in the input data.

The prior art systems have a number of disadvantages and limitations. For instance, the prior art fails to discover both prefixes and suffixes at the same time, and the prior art does not automatically analyze documents to find infixes. The prior art splits a word only into two parts—"a stem"+"a suffix," or "a prefix"+"a stem." Thus, if a stem has a prefix, the system cannot discover the prefix. Likewise, if a stem has a suffix, the system cannot find the suffix.

Also, the prior art cannot discover nested affixes (more than one prefix or suffix, such as the prefix "radio-immuno" and the suffix "less-ness"). The limitation on the length of an affix in the prior art keeps the prior art from finding many affixes that appear in technical documents, for example documents that exist in the fields of medicine, engineering, etc. In addition, the prior art fails to find affixes containing non-alphabetic characters such as digits and hyphens. These kinds of affixes often appear in technical documents such as the biomedical domain and chemistry.

SUMMARY OF THE INVENTION

An aspect of this invention is an improved system and method for determining affixes in one or more documents.

Another aspect of this invention is an improved system and method for determining nested affixes in one or more documents.

A further aspect of this invention is an improved system and method for determining affixes in one or more documents where the affixes are not available to the system in a dictionary.

Another aspect of this invention is an improved system and method for determining affixes in one or more documents in order to obtain stem words.

An aspect of this invention is an improved system and method for determining affixes in one or more documents to create dictionaries of affixes.

A further aspect of this invention is an improved system and method for determining affixes in one or more documents to provide input to other natural language processing systems.

The present invention provides a computer system and a method for analyzing text in one or more electronic documents. The computer system comprises one or more system interfaces; and an affix process that determines one or more affixes of one or more words in one or more of the documents and provides the affixes to the system interface.

The preferred embodiment of this invention, as described in detail below, may be used to build a domain specific morphology lexicon for NLP applications so that they can recognize out-of-vocabulary words. Furthermore, the processes of discovering prefixes and suffixes are not independent. Many words, especially in technical documents, have complex morphological structures, and thus the knowledge about prefixes helps the discovery of suffixes and vice versa. For example, for rhino-sinus-itis, if we knew that rhino is a prefix, then we can consider itis is a suffix even though rhinosinus does not appear in the lexicon nor in the documents.

In addition, in the preferred embodiment, the present invention does not limit the length of an affix, and is, consequently, able to find not only long affixes but also nested affixes (e.g., more than one prefix or suffix such as radioimmuno and lessness, respectively).

BRIEF DESCRIPTION OF THE DRAWINGS

The foregoing and other aspects and advantages of the invention will be better understood from the following, non-limiting, detailed description of preferred embodiments of the invention, given with reference to the drawings that include the following:

FIG. 5 is an example output of a preferred system of this invention.

DETAILED DESCRIPTION OF THE PREFERRED EMBODIMENTS

Domain-specific documents contain many domain-specific morphemes, and the knowledge on the morphemes is important to process those documents. The preferred embodiment of this invention provides an unsupervised, knowledge-free procedure for automatically discovering prefixes and suffixes from text.

The preferred procedure represents words in the documents as a Patricia (Practical Algorithm to Retrieval Information Coded in Alphanumeric) tree in order to easily identify the morphological structures of words, and thus acquire better potential candidates. Also, this procedure integrates prefix and suffix discovery in such a way that it can use knowledge about prefixes to find suffixes and vice versa.

The system of the invention is very useful for building morphology lexicons for NLP systems, especially for domain-specific documents. The performance of the procedure is evaluated with a domain-specific document collection and a general document collection. In addition, the preferred procedure of this invention proves to be simpler, faster and more accurate than previous approaches.

One goal of the preferred embodiment of the invention is to automatically generate lists of possible affixes from documents. Affixes for some human languages such as English and German have been relatively well studied and collected, typically by linguists. However, this is not true for many less-studied languages and technical languages, for example, in the biomedical domain.

For instance, 150 of 219 prefixes found in a biomedical document collection are domain specific prefixes. The preferred embodiment of this invention provides an unsupervised, knowledge-free procedure to automatically discover prefixes and suffixes of a language from text.

An affix is any element in the morphological structure of a word other than a stem. Affixes are traditionally divided into prefixes, which come before the form to which they are joined; suffixes, which come after; and infixes, which are inserted within a stem. The specific embodiment of the invention described herein focuses on finding prefixes and suffixes, but the present invention could be used for identifying infixes as well.

For the sake of simplicity, a word may be considered as being composed of zero or one prefix, a stem, and zero or one suffix. When a word has nested prefixes or suffixes, it is not necessary to try to separate these affixes into two affixes. For example, radioimmuno may be considered as a prefix and lessness may be considered as a suffix in radioimmuno-assay and sleep-lessness respectively.

More formally, prefixes and suffixes of a language L may be defined as follows: A string p is a prefix of a word w if w=pw' for another word w' of the language. A string s is a suffix of a word w if w=w"s for another word w" of the language.

Figure 1:
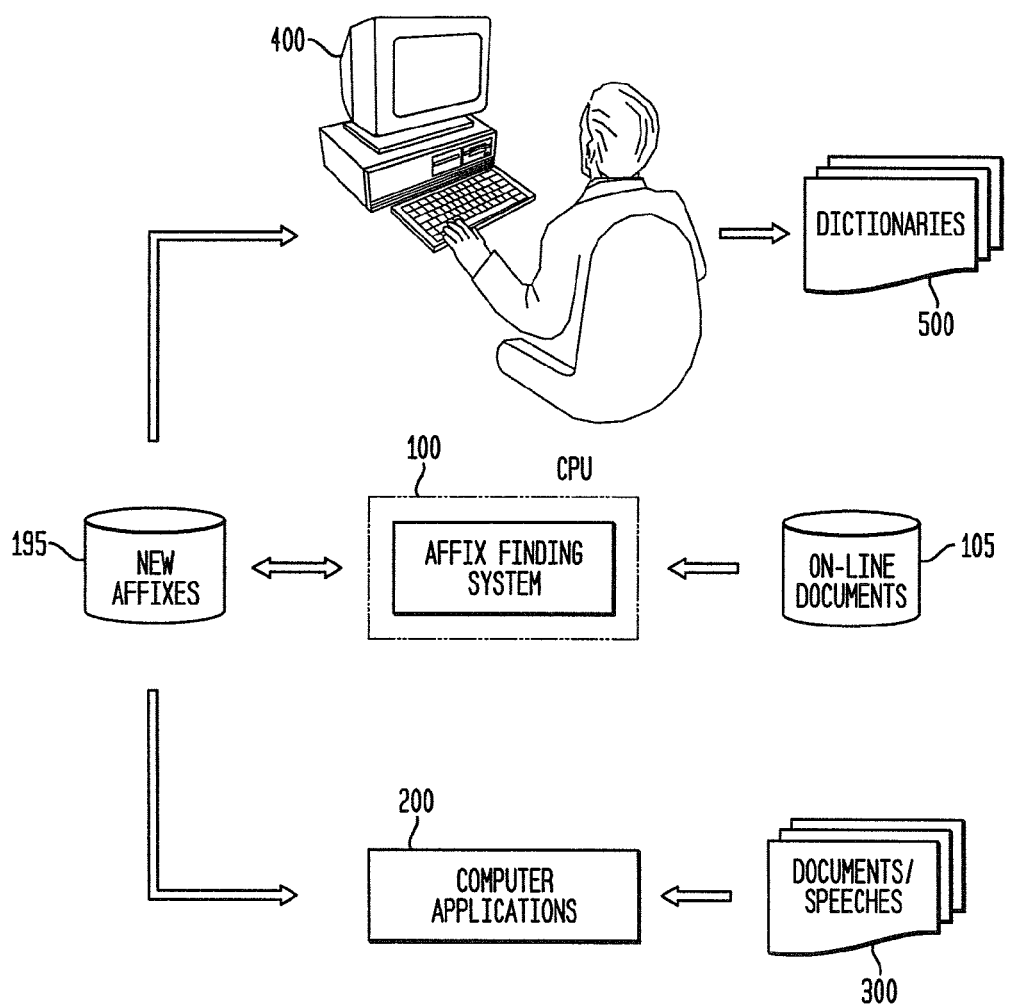
FIG. 1 is a block diagram illustrating one preferred embodiment of the present invention.

FIG. 1 generally illustrates the operation of a preferred embodiment of the present invention. Generally, the affix finding system or procedure, referenced at 100, searches through documents, which may be documents 105 available on the Internet, for new affixes. When these affixes are found, they are stored in storage medium 195. These new affixes may then be used by computer applications 200 in a search through documents and/or speeches 300. All of this may be done under the control or supervision of an operator, via a computer 400. Also, that computer 400 may have access to an electronic dictionary 500 to assist in the search for the affixes.

Figure 2:
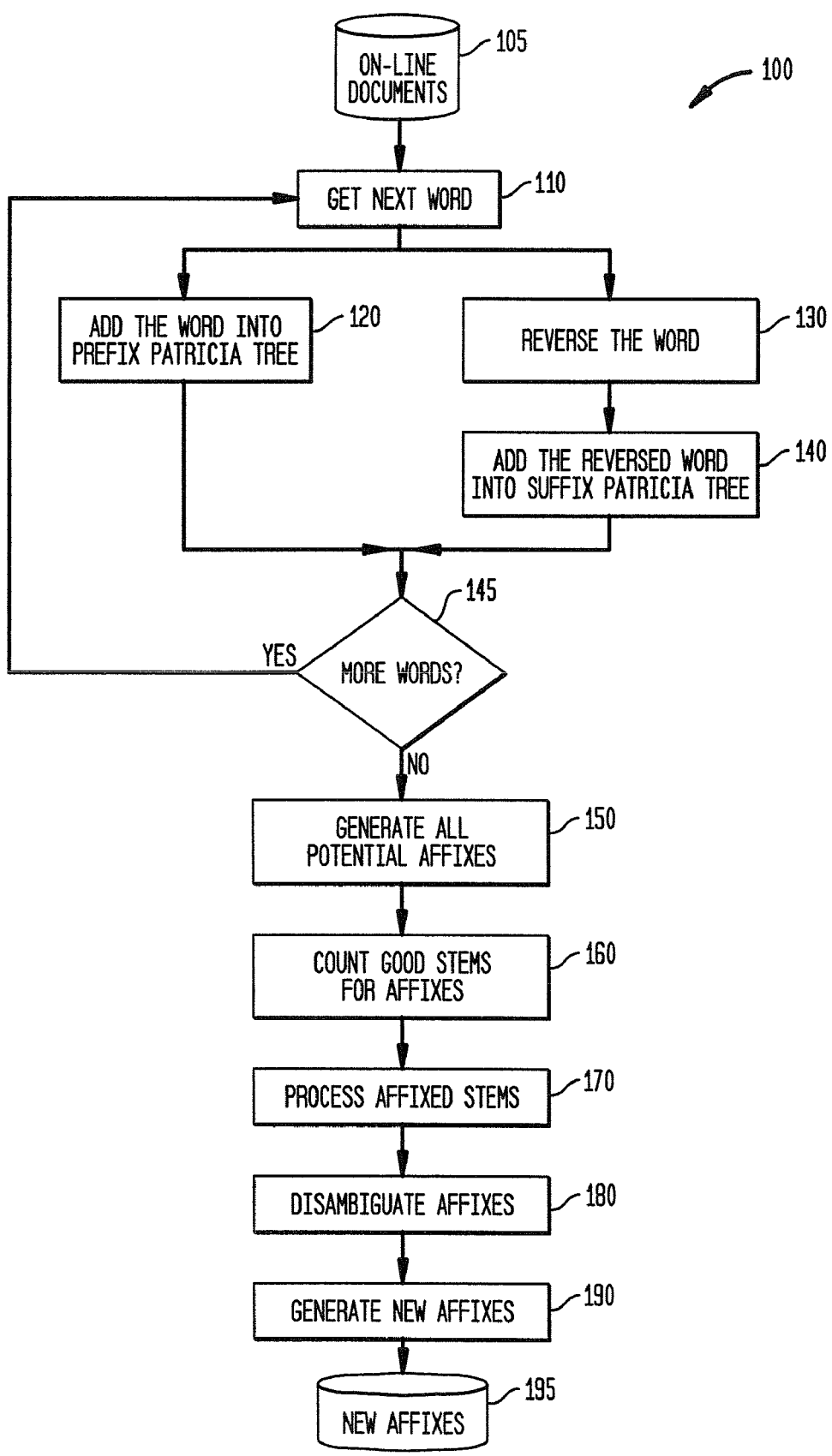
FIG. 2 is a flow chart of an affix finding process.

FIG. 2 is a flow chart illustrating steps of procedure 100. On-line documents are represented at 105, and at step 110, the next word to be studied is obtained. At step 120, the word is added into a prefix Patricia tree; while at steps 130 and 140, the word is reversed and then the reversed word is added into a suffix Patricia tree. At step 145, a decision is made whether more words are to be added to either of the Patricia trees. If so, the procedure returns to step 110 and continues on from there. Steps 110, 120, 130, 140 and 145 may be repeated until no more words are to be added to the Patricia trees.

Then, from step 145, the procedure goes to steps 150, 160 and 170. At step 150, all potential affixes are generated; at step 160, the number of good stems for affixes are counted; and at step 170, the affixed stems are processed. After step 170, the procedure goes to step 180, where affixes are disambiguated; and, after this, new affixes are generated at step 190. These new affixes are then added to storage medium 195.

The preferred procedure of this invention first represents all the words in the collection as Patricia trees, which visually show the morphological structures of the words and enables the potential candidates of prefixes and suffixes to be easily identified.

A Patricia tree is a compact representation of a trie. However, when constructing a trie over a large number of and extremely long strings, many of the internal nodes in the trie have only one descendent, and thus waste memory. A trie is turned into a Patricia tree by compressing all unary paths. Leaves and nodes with more than one child remain and represent the same string they did in trie.

Furthermore, the preferred procedure integrates prefix and suffix discovery so that it can use knowledge about prefixes to find suffixes and vice versa. It improves the candidate prefixes and suffixes through iterative refinement.

The preferred embodiment of the invention generates the initial sets of potential prefixes and suffixes from Patricia trees, and gradually refines the set of prefixes or suffixes with the knowledge on suffixes or prefixes which was discovered in the previous steps.

Figure 3:
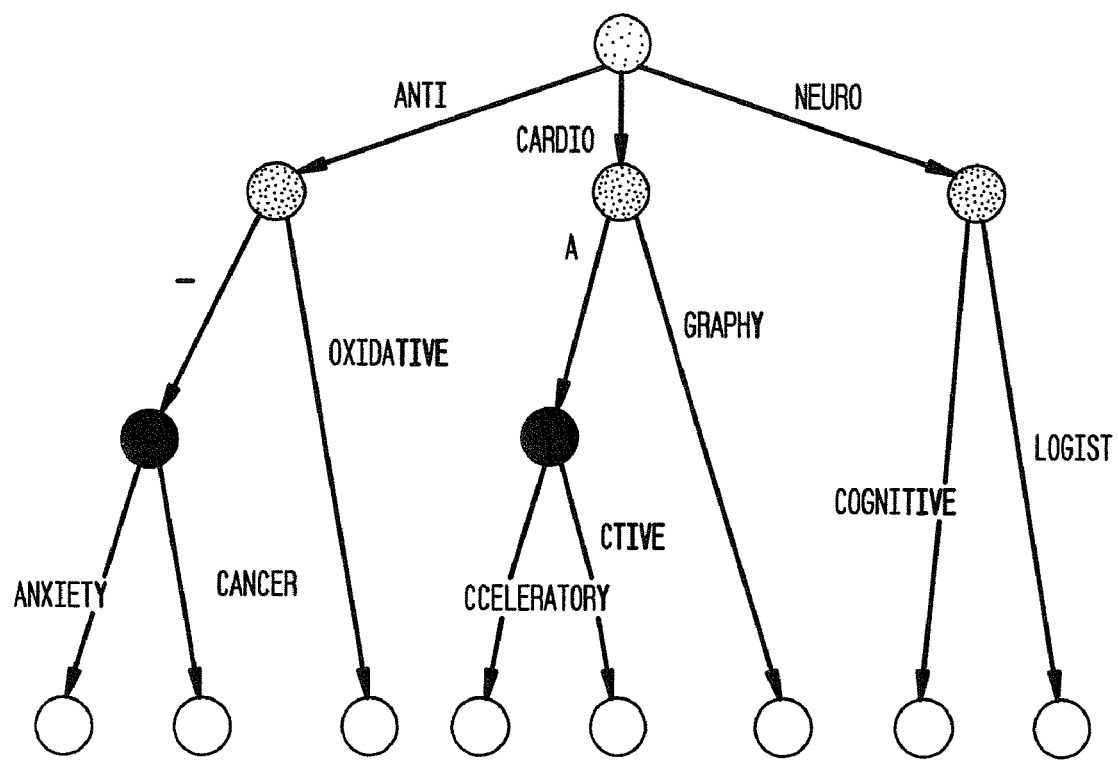
FIGS. 3 and 4 are diagrams showing tree representations of words in one or more document that are used to explain the affix finding process.
Figure 4:
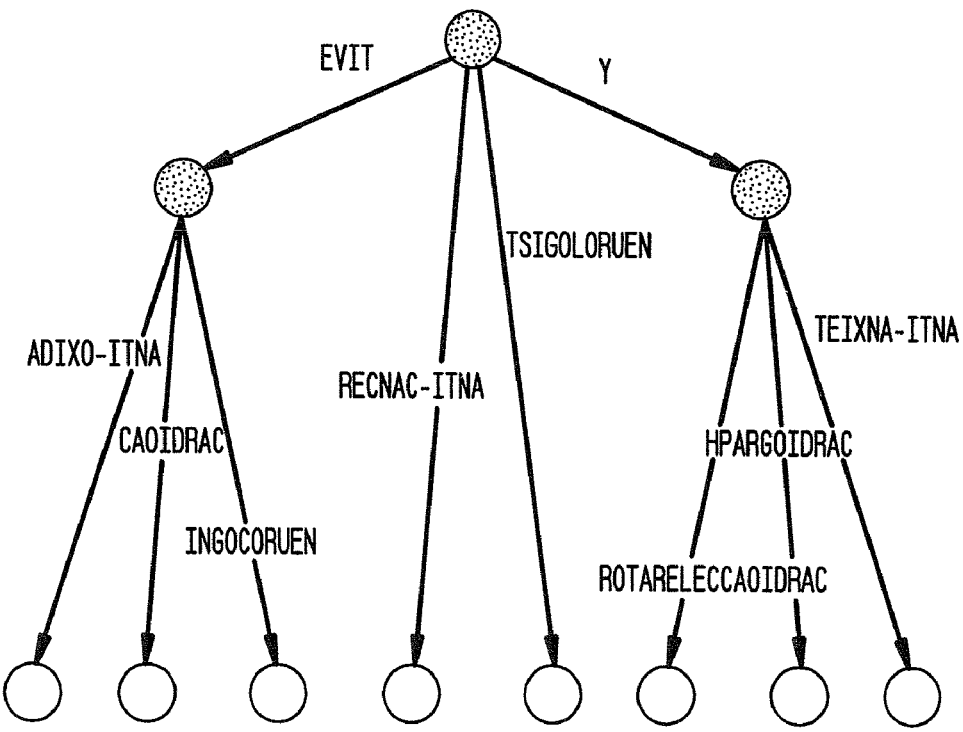

FIGS. 3 and 4 show examples of Patricia trees. More specifically, FIG. 3 is an example of a prefix Patricia tree for the words {anti-anxiety, anti-cancer, antioxidative, cardioacceleratory, cardioactive, cardiography, neurocognitive, neurologist}. In this example, all the strings for the internal nodes are potential prefixes. FIG. 4 is an example of a tree for reverse words, and in particular, for the reverse of the words {anti-anxiety, anti-cancer, antioxidative, cardioacceleratory, cardioactive, cardiography, neurocognitive, neurologist}. In this tree, all the strings for the internal nodes are potential suffixes.

FIG. 5 shows an example output that may be obtained with the present invention. This output was obtained searching through biomedical documents for prefixes and suffixes in a collection of "medline" abstracts. The upper half of FIG. 5 lists the prefixes that were found, and the lower half of the Figure lists the suffixes that were found.

The preferred embodiment of the invention, as described above, has a number of important advantages. For example, by using a Patricia tree, this preferred embodiment can recognize potential prefixes or suffixes without parsing words into pieces. A Patricia tree visually shows common substrings of words, and these common substrings are actually potential affixes. Also, the preferred embodiment does not limit the length of an affix, and is able to find not only long affixes but also nested affixes. In addition, the present invention may be effectively used to find affixes containing non-alphabetic characters such as digits and hyphens.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A computer system for analyzing text in one or more electronic documents, comprising:
   one or more system interfaces; and
   an affix process that determines one or more affixes of one or more words in one or more of the documents and provides the affixes to the system interface, said process comprising obtaining a collection of words, representing all of the words in the collection as Patricia trees to show visually morphological structures of the words to facilitate identifying potential candidates of prefixes and suffixes from the words in the collection, including using the words to construct first and second tries, each of the tries having a multitude of paths and a multitude of nodes, each of the nodes being connected to one or more of the other of the nodes, and compressing the first and second tries by compressing all unary paths on the tries to form a prefix Patricia tree and a suffix Patricia tree, including adding the words into the prefix Patricia Tree, using the prefix Patricia Tree to identify a set of candidate prefixes from the words in the collection, reversing each of the words, adding the reversed words into the suffix Patricia Tree, using the suffix Patricia Tree to identify a set of candidate suffixes from the words in the collection, refining the sets of candidate prefixes and suffixes to identify actual prefixes and suffixes, including using knowledge of prefixes previously identified in said refining to further refine the set of candidate suffixes, and using knowledge of suffixes previously identified in said refining to further refine the set of candidate prefixes.

2. A system, as in claim 1, where one or more of the affixes are nested affixes, each nested affix comprising one or more affixes.

3. A system, as in claim 1, where the affix process determines one or more suffixes of one or more of the words.

4. A system, as in claim 3, where one or more of the suffixes are nested suffixes, each nested suffix comprising one or more suffixes.

5. A system, as in claim 1, where the affix process determines one or more infixes of one or more of the words.

6. A system, as in claim 5, where one or more of the infixes are nested infixes, each nested infix comprising one or more infixes.

7. A system, as in claim 1, wherein the affix process determines one or more prefixes of one or more of the words.

8. A system, as in claim 7, wherein one or more of the prefixes are nested prefixes, each nested prefix comprising one or more prefix.

9. A system, as in claim 1, where the interface compiles a list of affixes that are in one or more of the documents.

10. A system, as in claim 1, where the affixes are not listed in a dictionary that is accessible to the system.

11. A system, as in claim 1, where the system interface is any one or more of the following: a graphical user interface, a print out, an interface to a text analysis system.

12. A method for analyzing text in one or more electronic documents, comprising the steps:
   using a computer system to perform an affix process that determines one or more affixes of one or more words in one or more of the electronic documents; and
   providing the determined one or more of the affixes to an interface of the computer system for display to a user; and wherein:
   the step of using the computer system includes the steps of obtaining a collection of words, representing all of the words in the collection as Patricia trees to show visually morphological structures of the words to facilitate identifying potential candidates of prefixes and suffixes from the words in the collection, including using the words to construct first and second tries, each of the tries having a multitude of paths and a multitude of nodes, each of the nodes being connected to one or more of the other of the nodes, and compressing the first and second tries by compressing all unary paths on the tries to form a prefix Patricia tree and a suffix Patricia tree, including adding the words into the prefix Patricia Tree, using the prefix Patricia Tree to identify a set of candidate prefixes from the words in the collection, reversing each of the words, adding the reversed words into the suffix Patricia Tree, using the suffix Patricia Tree to identify a set of candidate suffixes from the words in the collection, refining the sets of candidate prefixes and suffixes to identify actual prefixes and suffixes, including the step of using knowledge of prefixes previously identified in said refining step to further refine the set of candidate suffixes, and using knowledge of suffixes previously identified in said refining to further refine the set of candidate prefixes.

13. A method according to claim 12, wherein at least one of the affixes is a nested affix including a plurality of affixes.

14. A method according to claim 12, further comprising the step of, said interface compiling a list of the determined one or more affixes.

15. A method according to claim 12, wherein the step of using the computer system includes the further step of counting stems, which meet defined criteria, for the affixes for the words in said set of words.

16. A method according to claim 12, wherein the step of using the computer system includes the further step of disambiguating at least some of the potential affixes to identify nested affixes.

17. A method according to claim 12, wherein the step of using the computer system includes the further steps of:
disambiguating some of the affixes; and
generating new affixes from the disambiguated affixes; and wherein a plurality of the affixes include non-alphabetic characters including digits and hyphens.

18. The method according to claim 12, wherein:
the prefix Patricia tree includes a multitude of internal nodes and strings for the internal nodes;
the suffix Patricia tree includes a multitude of internal nodes and strings for the internal nodes of the suffix Patricia tree;
in the prefix Patricia tree, all the strings for the internal nodes of the prefix Patricia tree are potential prefixes; and
in the suffix Patricia tree, all the strings for the internal nodes of the suffix Patricia tree are potential suffixes.

19. A tangible program storage device readable by machine, tangibly embodying a program of instructions executable by the machine to perform method steps for analyzing text in one or more electronic documents, said method steps comprising:

using a computer system to perform an affix process that determines one or more affixes of one or more words in one or more of the electronic documents; and
providing the determined one or more of the affixes to an interface of the computer system for display to a user; and wherein:
the step of using the computer system includes the steps of obtaining a collection of words, representing all of the words in the collection as Patricia trees to show visually morphological structures of the words to facilitate identifying potential candidates of prefixes and suffixes from the words in the collection, including using the words to construct first and second tries, each of the tries having a multitude of paths and a multitude of nodes, each of the nodes being connected to one or more of the other of the nodes, and compressing the first and second tries by compressing all unary paths on the tries to form a prefix Patricia tree and a suffix Patricia tree, including adding the words into the prefix Patricia Tree, using the prefix Patricia Tree to identify a set of candidate prefixes from the words in the collection, reversing each of the words, adding the reversed words into the suffix Patricia Tree, using the suffix Patricia Tree to identify a set of candidate suffixes from the words in the collection, refining the sets of candidate prefixes and suffixes to identify actual prefixes and suffixes, including the step of using knowledge of prefixes previously identified in said refining step to further refine the set of candidate and suffixes, and using knowledge of suffixes previously identified in said refining to further refine the set of candidate prefixes.

20. A program storage device according to claim 19, wherein at least one of the affixes is a nested affix including a plurality of affixes.

21. A program storage device according to claim 19, further comprising the step of, said interface compiling a list of the determined one or more affixes.

22. A program storage device according to claim 19, wherein the step of using the computer system includes the further step of counting stems, which meet defined criteria, for the affixes for the words in said set of words.

23. A program storage device according to claim 22, wherein the step of using the computer system includes the further step of disambiguating at least some of the potential affixes to identify nested affixes.

* * * * *